United States Patent
Lillo et al.

(10) Patent No.: US 8,027,413 B2
(45) Date of Patent: Sep. 27, 2011

(54) ULTRATIGHT COUPLING PREFILTER DETECTION BLOCK

(75) Inventors: Walter E. Lillo, Torrance, CA (US); Manorama Gollakota, Rancho Palos Verdes, CA (US); John Lukesh, Torrance, CA (US); Randal K. Douglas, Redondo Beach, CA (US)

(73) Assignee: The Aerospace Corporation, El Segundo, CA (US)

( * ) Notice: Subject to any disclaimer, the term of this patent is extended or adjusted under 35 U.S.C. 154(b) by 1011 days.

(21) Appl. No.: 11/827,238

(22) Filed: Jul. 11, 2007

(65) Prior Publication Data

US 2009/0016414 A1 Jan. 15, 2009

(51) Int. Cl.
*H03D 1/00* (2006.01)
(52) U.S. Cl. ........ 375/343; 375/150; 375/295; 375/316; 375/342; 375/350; 701/213; 701/216
(58) Field of Classification Search .................. 375/146, 375/150, 220, 259, 268, 292, 316, 322, 329, 375/340, 342, 343, 345, 346, 350
See application file for complete search history.

(56) References Cited

U.S. PATENT DOCUMENTS

| | | | | |
|---|---|---|---|---|
| 7,274,504 | B2 * | 9/2007 | Crane et al. | 342/357.65 |
| 7,899,109 | B2 * | 3/2011 | Douglas | 375/150 |
| 2006/0015250 | A1 * | 1/2006 | Kim | 701/213 |
| 2007/0024496 | A1 * | 2/2007 | Wright et al. | 342/357.02 |
| 2007/0096977 | A1 * | 5/2007 | Lillo et al. | 342/357.02 |
| 2007/0118286 | A1 * | 5/2007 | Wang et al. | 701/213 |
| 2007/0205940 | A1 * | 9/2007 | Yang et al. | 342/357.12 |
| 2007/0253471 | A1 * | 11/2007 | Wilhelmsson et al. | 375/150 |
| 2010/0211316 | A1 * | 8/2010 | Da Silva et al. | 701/216 |

* cited by examiner

*Primary Examiner* — Shuwang Liu
*Assistant Examiner* — Hirdepal Singh
(74) *Attorney, Agent, or Firm* — K & L Gates

(57) ABSTRACT

An observation lock detector block receives I&Q correlations and generates error measurement vectors, each including phase, frequency, code, pseudorange, and covariance residual estimates, and generates validity indicator and confidence indicator vectors, one of which error measurement vectors is an output as a selected error measurement vector with a respective validity indicator and confidence indicator vector, both of which selected vectors are communicated to a navigation solution processor in a ultratightly coupled navigation system for providing improved estimations of a navigation solution, the indicators indicating the usefulness of measurement errors, the prefilter detector block comprising discriminators, sequential filters, observation lock detectors and a measurement selector for selecting measurement vector based on phase, frequency, and code discriminations, the measurement errors being residual estimates that are indicated as valid or invalid for dynamic propagation of the residuals in a navigation receiver for improved performance, especially in low signal-to-noise environments, such as, for use in an ultratight GPS navigation system.

19 Claims, 7 Drawing Sheets

ULTRATIGHT NAVIGATION SYSTEM

ULTRATIGHT NAVIGATION SYSTEM

ULTRATIGHT NAVIGATION PROCESSOR

PREFILTER DETECTION BLOCK

OBSERVATION LOCK DETECTOR

I & Q MAXIMIZER LOOK UP TABLE

I & Q TRANSFORMER

ULTRATIGHT COUPLING PREFILTER DETECTION BLOCK

STATEMENT OF GOVERNMENT INTEREST

The invention was made with Government support under contract No. FA8802-04-C-0001 by the Department of the Air Force. The Government has certain rights in the invention.

FIELD OF THE INVENTION

The invention relates to the field of ultratight navigation systems. More particularly the present invention is related to GPS ultratight coupling navigation receivers.

BACKGROUND OF THE INVENTION

Navigation systems are increasing dependency upon the global positioning system (GPS). The navigation receiver should be able to withstand intentional or unintentional signal interference with robust signal acquisition and tracking. For this reason, inertial navigation systems have been coupled to GPS signal tracking and acquisition systems for improved signal tracking and acquisition of the received signal. Inertial navigation systems (INS) have an inertial measurement unit (IMU) for processing inertial measurements. Coupling navigation data with the GPS signal tracking and acquisition system improves signal tracking and acquisition. When the inertial measurements of a navigation processor are used with a GPS signal tracking and acquisition system, the combined system is said to be coupled. The tightly coupled GPS and INS system uses validated pseudorange and pseudorange rate measurements from the GPS receiver instead of the processed position and velocity measurements. In addition, inertial measurement unit data is usually used to assist the receiver tracking loops and enable more noise filtering than would be possible without tracking loop aiding.

The tightly coupled systems have been used with validated pseudorange and pseudorange rate measurements. More recently, ultratight GPS and INS coupling has been proposed which drives all signals from the INS navigation solution for a period of time, and then, examines all signals with respect to the error of the navigation solution. Ultratight receivers do not attempt to control code replicas for exact code phase alignment with the incoming signal but merely seek to observe the deviation of the incoming signal from locally generated replicas and feed that deviation information back to the code replica generators. Ultratight coupling has shown to be more robust in the presence of noise. Ultratight coupling does not require that the replica code track or lock onto the incoming signal. Ultratight coupling systems have been disclosed in U.S. Pat. No. 6,516,021. Observation lock detectors have been developed to extend the concept of lock detection to ultratightly coupled systems. The observation lock detectors enables error measurements to be validated before applying the error measurement to the navigation state estimate, and provides a metric of system performance.

All GPS receivers whether uncoupled, loosely coupled, tightly coupled, or ultratightly coupled correlate inphase and quadrature early E, prompt P, and late L, GPS signal replicas with the incoming GPS signal resulting in early, prompt, and late quadrature correlations that are denoted as $I_E$, $Q_E$, $I_P$, $Q_P$, $I_L$, $Q_L$. These quadrature correlations have a nonlinear relationship to the difference between each replica code or carrier phase and that of the incoming received signal. The quadrature correlations are therefore used to determine the difference in the replicas code and carrier phase and that of the incoming signal. The difference between the replica code or carrier phase and that of the incoming signal is used to refine the estimate of the navigation state solution because the code and carrier phase of the incoming signal are related to the true range from the receiver to the transmitting satellite as the code and carrier phase of the replicas are related to the estimated range from the receiver to the satellite.

In ultratightly coupled receivers, a prefilter is typically a sequential filter that filters the quadrature correlation outputs to estimate one or more quantities such as a pseudorange error $\Delta\rho$, pseudorange error rate $\Delta\dot{\rho}$, a pseudorange error acceleration $\Delta\ddot{\rho}$, carrier phase error $\phi$, a carrier frequency error $\phi'$, carrier phase acceleration error $\phi''$, a total electron content error $\Delta TEC$, a total electron content error rate $\Delta TEC'$, as well as a measurement covariance matrix M. The output of the prefilter is received by a lock detector. When the estimates are valid, then the estimates are forwarded to the navigation state estimator as measurements for determining the navigation solution.

A plurality of nonlinear transforms of the quadrature correlation outputs, called discriminators, are often used in tracking loop systems. Three types of discriminators are commonly used: carrier phase discriminators, carrier frequency discriminators, and code discriminators. The carrier phase discriminators may simply be the quadrature correlation outputs or a product of the quadrature correlation outputs, which results in the data bits being stripped off. The carrier phase discriminators provide the most information, but the carrier phase discriminators are also the most nonlinear so that carrier phase information may not be easily extracted by a sequential filter. When all of the epoch information can be extracted from the carrier phase discriminators by the sequential filter, there is no need to use the other carrier frequency discriminators or the code discriminators. The phase discriminators contain the most epoch information of received signal epoch timing. The carrier frequency discriminator's functions of the correlator outputs possess no carrier phase information but do contain carrier frequency information. The carrier frequency discriminators do not provide as much epoch information as the carrier phase discriminator. However, the carrier frequency discriminator provides information that is more readily extracted by a sequential filter. Sequential filter processing of epoch timing information from carrier frequency discriminators is less accurate than a sequential filter processing of epoch timing information from carrier phase discriminators, but the sequential filter processing of epoch timing information from carrier frequency discriminators is more robust. The code discriminators provide the least epoch information, but that epoch information provided is the most easily extracted by a sequential filter. A sequential filter processing of epoch timing information from the code discriminators is the most robust but less accurate than sequential filters processing of epoch timing information from the carrier phase discriminators or the carrier frequency discriminators. Existing conventional tracking loop systems use multiple discriminators in conjunction with lock detectors to ensure that the most accurate epoch timing information is being processed only when valid. The less accurate discriminators are used only when the epoch information from the carrier phase discriminators cannot be reliably extracted. Multiple sequential prefilters have been proposed to solve the multipath problem. However, each of the sequential filters employed corresponds to a different multipath assumption. Parallel sequential prefilters have been used. Each of the parallel sequential prefilters have a different assumed noise level and apply the prefilters to the same I&Q correlations. As such, existing systems use a signal discriminator as input to the sequential filters. Consequently, existing navigation systems do not ensure that the most accurate and reliable epoch timing information is being extracted, validated, and used to compute the navigation solution. These and other disadvantages are solved or reduced by the present invention.

SUMMARY OF THE INVENTION

An object of the invention is to provide a navigation system using multiple prefilters and observation lock detectors.

Another object of the invention is to provide an ultratight navigation system using multiple prefilters and observation lock detectors.

Another object of the invention is to provide an ultratight navigation system using multiple prefilters and observation lock detectors for providing a measurement error vector.

Yet another object of the invention is to provide an ultratight navigation system using multiple prefilters and observation lock detectors for providing a measurement error vector and a lock indictor and confidence vector.

Still another object of the invention is to provide a navigation system using multiple prefilters and observation lock detectors for providing a measurement error vector and a lock indicator and confidence vector where the lock indicator and confidence vectors indicates accuracy of measurements in the measurement error vector.

The invention is directed to a system receiving GPS signals and uses an ultra-tight system with multiple prefilters operating in parallel with observation lock detectors and a single measurement selector. A prefilter detection block provides a measurement error vector of errors and confidence indicators for the measurement errors in the error vector. The measurement selector selects the measurement errors for the prefilter and observation lock detector providing the most reliable measurement errors from all of the multiple prefilters, as indicated by the lock indicator and confidence vector. The measurement errors and indicators are used by the system to provide a robust reliable system output. In the case of a GPS navigation processor, the system provides the most reliable position and navigation solution. These and other advantages will become more apparent in the detailed description of the preferred embodiment.

DETAILED DESCRIPTION OF THE PREFERRED EMBODIMENT

Figure 1:
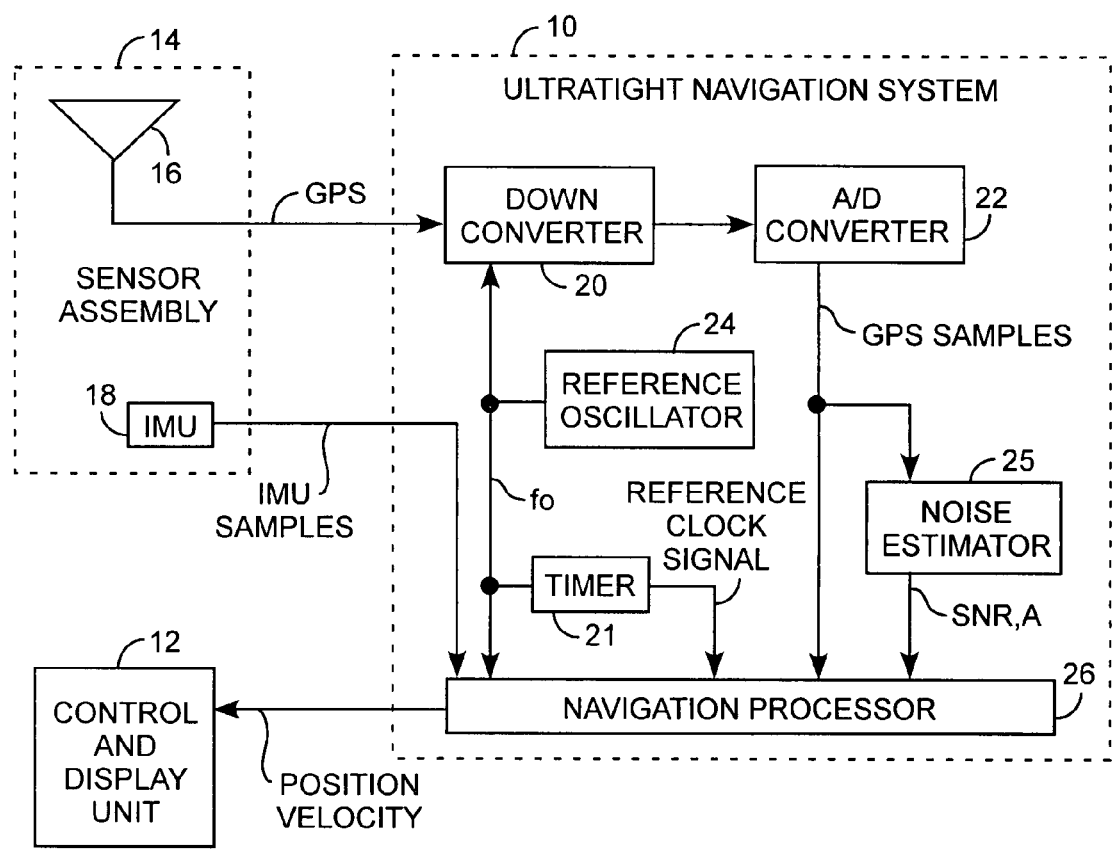
FIG. 1 is a block diagram of an ultratight navigation system.

An embodiment of the invention is described with reference to the figures using reference designations as shown in the figures. Referring to FIG. 1, a global positioning system (GPS) inertial navigation system includes an ultratight navigation system 10 receiving GPS signals and inertial measurement unit samples from a sensor assembly 14. The ultratight navigation system 10 provides position and velocity data to a control and display unit 12. The navigation system 10 functions as a GPS inertial navigation system tracking GPS signals from a plurality of in-view satellites, not shown. The sensor assembly 14 includes an antenna 16 for receiving received GPS signals and communicating the received GPS signals communicated to the navigation system 10. The sensor assembly also includes an inertial measurement unit (IMU) 18 providing the IMU samples that are also communicated to the ultratight navigation system 10. In the preferred form, the IMU 18 may be a microelectromechanical system (MEMS) IMU embedded in the antenna 16.

The ultratight navigation system 10 includes a downconverter 20 for frequency downconversion of the GPS signals using a reference oscillator 24 providing a $f_o$ internal frequency reference. The $f_o$ internal frequency reference is fed into a timer 21 for generating a reference clock signal. The system 10 further includes an analog-to-digital (A/D) converter 22 communicating for converting the downconverted GPS signals into digitized GPS samples. The GPS samples are communicated to a navigation processor 26 and to a noise estimator 25. The noise estimator 25 generates an estimated signal-to-noise ratio (SNR) estimate and an estimated amplitude A. The noise estimator 25 communicates the estimates SNR and A to the navigation processor 26. The navigation processor 26 receives the reference clock signal from the timer 21 for computing a navigation solution. The navigation processor 26 also receives the IMU samples from the IMU 18. The navigation processor 26 uses an internal frequency reference $f_o$ from the reference oscillator 24 as well as the reference clock signal from the timer 21 in determining the navigation solution. The navigation processor 26 provides the position and velocity data as a navigation solution to a control and display unit 12.

Figure 2:
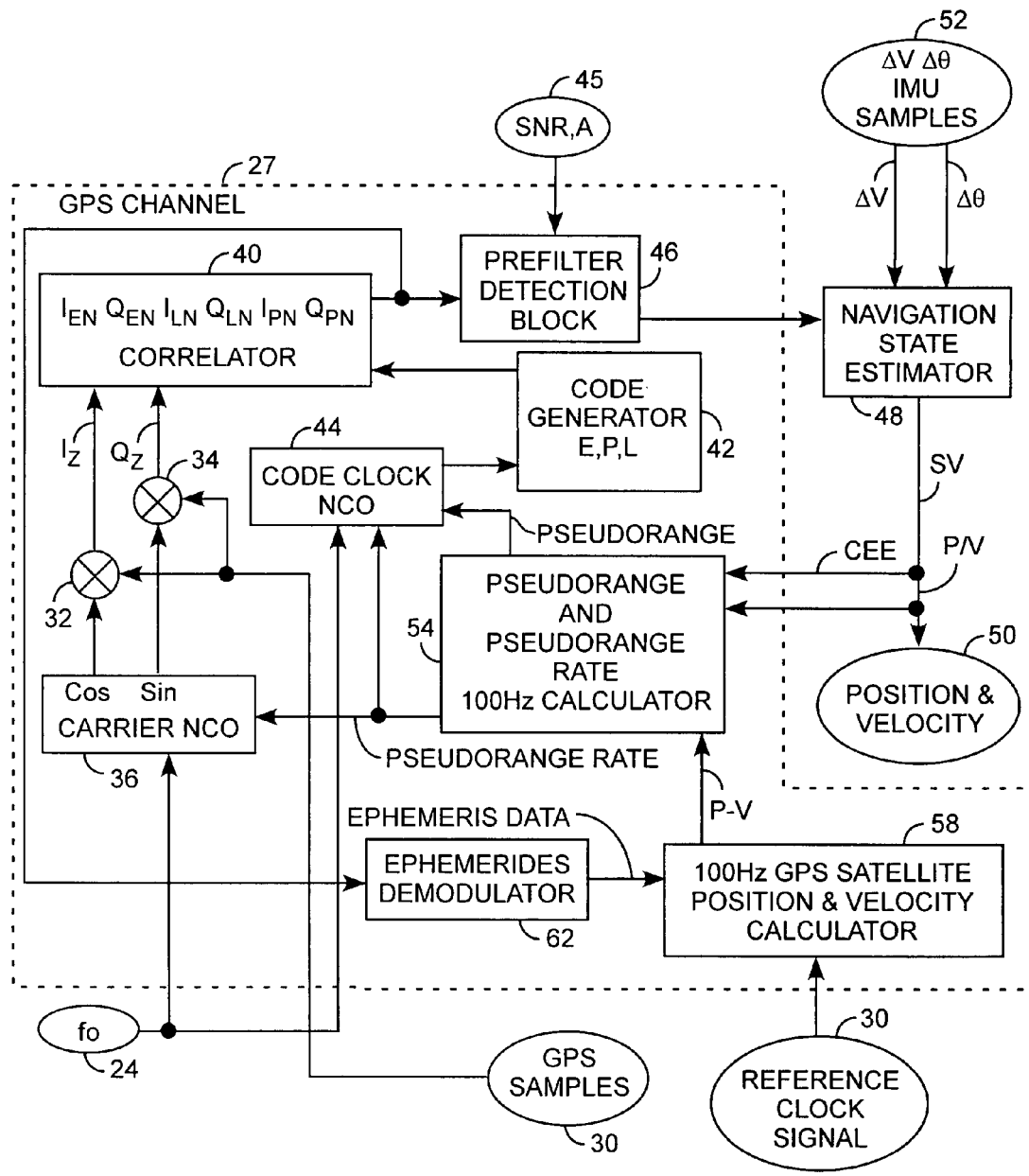
FIG. 2 is a block diagram of a navigation processor.

Referring to FIGS. 1 and 2, and more particularly to FIG. 2, the ultratight navigation system 10 includes a navigation processor 26 receiving the digitized GPS samples 30 in a GPS channel 27. Preferably, there is a channel 27 for each GPS satellite in view. The GPS samples 30 are communicated to mixers 32 and 34 for providing demodulated inphase $I_Z$ and quadrature $Q_Z$ signals as demodulated quadrature signals respectively using cos and sin demodulation signals from a carrier numerically controlled oscillator (NCO) 36 driven by the $f_o$ oscillator reference clock signal 24. The cos and sin demodulation signals are replica carrier signals for carrier demodulating the received GPS samples 30. The $I_Z$ and $Q_Z$ demodulated quadrature signals are received by a correlator 40. The correlator 40 also receives early E, prompt P, and late L code replica signals from a chipping code generator 42. The code generator 42 receives a chipping code clocking signal from a code clock NCO 44.

The correlator 40 may operate at 50.0 Hz. The correlator 40 provides inphase and quadrature, early, prompt, and late $I_E$, $Q_E$, $I_L$, $Q_L$, $I_P$, and $Q_P$ quadrature correlation signals for a GPS satellite channel 27. There will be correlator outputs for channels one through N. As such, the correlator outputs from a specific correlator output are denoted $I_{EN}$, $Q_{EN}$, $I_{LN}$, $Q_{LN}$, $I_{PN}$, and $Q_{PN}$ channel correlations. Likewise the output of any block in the diagram can be modified by an additional subscript to denote the output of a specific channel. When the additional subscript is missing, the statement applies to all output of the corresponding block of every channel. Thus, the correlation outputs for an arbitrary correlator are denoted by $I_E$, $Q_E$, $I_L$, $Q_L$, $I_P$, and $Q_P$ correlations. These correlation outputs are communicated to a prefilter detection block 46. The prefilter detection block 46 also receives the SNR and A noise estimates 45 from the noise estimator 25. The $I_E$, $Q_E$, $I_L$, $Q_L$, $I_P$, and $Q_P$ correlations may be communicated at 50.0

Hertz to the prefilter detection block 46 having a 1.0 Hertz output. The output of the prefilter detection block includes measurement errors, lock validity indicators, and confidence indicators that are communicated to a navigation state estimator 48. The time interval T between outputs of the prefilter detection block 46 is referred to as an epoch time interval.

The navigation state estimator 48 receives the measurement errors and indicators from the prefilter detection block 46 of every channel and in turn repetitively computes estimates of the position and velocity in state vector SV and outputs P/V position and velocity data 50 communicated to the control and display unit 12. The $\Delta V$ and $\Delta \theta$ IMU samples 52 are also communicated to the navigation state estimator 48. The navigation state estimator 48 uses the IMU samples 52 to propagate the state vector SV that includes the position and velocity estimates P/V. At the end of each of the one-second major cycles, also called an epoch, the navigation state estimator 48 updates the state vector SV based upon the measurement errors and indicators from the prefilter detection block 46 from each channel and the IMU samples 52 from the IMU 18. The IMU samples 52 are repetitively generated, for example, one hundred times a second, and include the differential velocity samples $\Delta V$ and the differential attitude samples $\Delta \theta$ that are communicated to navigation state estimator 48. The P/V position and velocity data 50 is communicated to the 100 Hz pseudorange and pseudorange rate calculator 54 of every channel that in turn provides a pseudorange rate estimate to the carrier NCO 36. The 100 Hz pseudorange and pseudorange rate calculator 54 also provides a pseudorange and pseudorange rate estimates to the code NCO 44 that is clocked by the clock reference $f_o$. The pseudorange and pseudorange rate calculator 54 also receives calculated GPS satellite position and velocity data P-V from a 100 Hz GPS satellite position and velocity calculator 58. The calculator 54 also receives user clock error estimates CEE from the navigation state estimator 48. The satellite P-V data references the GPS satellite calculated position and velocity. The clock error estimates CEE include a clock phase error and clock frequency error that is the time derivative of the clock phase error. The calculated pseudorange estimate is equal to the geometric line of sight range to a satellite adjusted by the clock phase error estimates CEE and certain signal propagation compensation terms, such as the nominal ionosphere and troposphere delays. The pseudorange rate estimate is equal to the relative geometric velocity estimate to the satellite from the user antenna 16 plus the clock frequency error estimate. The 100 Hz GPS satellite position and velocity calculator 58 is driven by the reference clock 30 from the timer 21. The calculator 58 receives demodulated ephemeris data from an ephemeris demodulator 62. The ephemeris demodulator 62 generates the ephemeris data preferably from the correlations 80 and otherwise GPS samples 30.

The correlation process of the correlator 40 is based upon the early E, prompt P, and late L code replicas generated by the code generator 42, and upon the carrier replica generated by the carrier NCO 36. As the pseudorange estimates and pseudorange rate estimates from the calculator 54 are refreshed during each one hundred hertz cycle, the replica carrier cos and sin signals from the NCO 36 and the early E, prompt P, and late L code replicas are adjusted. The correlator 40, operating at 50.0 Hz for example, enables conventional early, prompt, and late correlations by providing the early, prompt, and late I&Q quadrature correlations to the prefilter detection block 46 as $I_E$, $Q_E$, $I_P$, $Q_P$, $I_L$, and $Q_L$ correlations. The I&Q quadrature correlations are used to estimate the residual estimates vector. The carrier and code phase of the replica signals as compared to the received GPS samples 30 have offsets, that is, phases, also known as phase errors.

Figure 3:
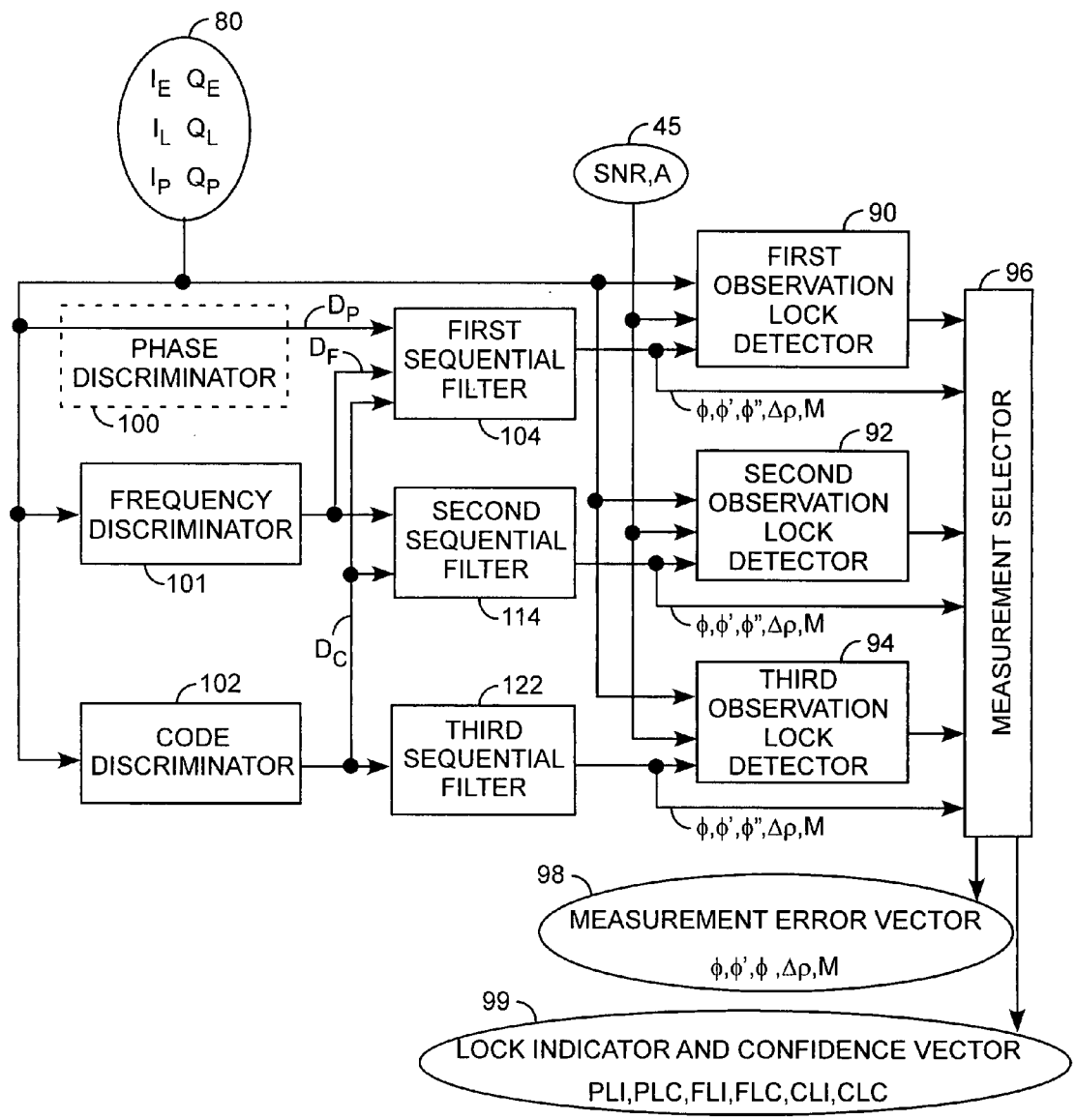
FIG. 3 is a block diagram of a prefilter detection block.

Referring to FIGS. 1, 2, and 3 and more particularly to FIG. 3, the prefilter detection block 46 receives correlations 80 and noise estimates 45 and provides $\phi$, $\phi'$, $\phi''$, $\Delta \rho$, and M error measurements, and a lock indicator and confidence vector comprised of phase, frequency, and code indicators and measures of the confidence of the phase, frequency and code validity indicators called phase, frequency, and code confidences respectively.

The indicator vector includes a phase lock validity indicator PLI, a phase lock confidence indicator PLC, a frequency lock validity indicator FLI, a frequency lock confidence indicator FLC, a code lock validity indicator CLI, and a code lock confidence indicator CLC. The measurement selector 96 selects one of the indicator vectors from the respective observation lock detectors 90, 92, and 94, and provides an output lock indicator and confidence vector 99 also including the phase lock validity indicator PLI, phase lock confidence indicator PLC, frequency lock validity indicator FLI, frequency lock confidence indicator FLC, a code lock validity indicator CLI, and the code lock confidence indicator CLC. The measurement selector 96 also selects and transmits the measurement error vector from the sequential filter which feeds the observation lock detector whose lock indicator and confidence vector was selected.

The prefilter detection block 46 includes a plurality of discriminators including a phase discriminator 100, a frequency discriminator 101, and a code discriminator 102. Each of the discriminators 100, 101, and 102 receive the correlations 80 and generate respective discriminations $D_P$, $D_F$, and $D_C$. The phase discriminator is preferably an identity function where the phase discriminations $D_P$ are the same as the I&Q correlations 80. The discriminations $D_P$, $D_F$, and $D_C$ are respectively communicated to a first sequential filter 104, a second sequential filter 114, and a third sequential filter 122. The first sequential filter 104 receives $D_P$, $D_F$, and $D_C$ as inputs. The second sequential filter 114 receives $D_F$, and $D_C$ as inputs, and the third sequential filter 122 receives $D_C$ as input. Each sequential filter 104, 114, and 122 provide respective measurement error vectors to the respective observations lock detectors 90, 92, and 94. The sequential filters 104, 114, and 122 generate measurement errors provided as a measurement error vector 89. More specifically, the sequential filters 104, 114, and 122 compute the pseudorange error $\Delta \rho$, the pseudorange rate error $\Delta \dot{\rho}$, the pseudorange acceleration error $\Delta \ddot{\rho}$, as well as the carrier phase error $\phi$, the carrier frequency error $\phi'$, and the carrier phase acceleration error $\phi''$. The pseudorange error rate $\Delta \dot{\rho}$ is the first derivative time rate of the change of the pseudorange error $\Delta \rho$. The pseudorange error acceleration $\Delta \ddot{\rho}$ is the second derivative time rate of change of the pseudorange error $\Delta \rho$. The prefilter detection block 46 also computes a measurement covariance matrix M indicating the uncertainties in the residual estimates vector for a number of samples m over a major cycle epoch time T.

In addition to the lock indicator and confidence vector, The prefilter detection block 46 outputs the measurement error vector comprising $\phi$, $\phi'$, $\phi''$, $\Delta \rho$, and M. The measurement error vector is received by a navigation state estimator 48 that may have a one-second major cycle time period between epochs. In the preferred form, the first sequential filter 104 provides a measurement error vector comprising $\phi$, $\phi'$, $\phi''$, $\Delta \rho$, and M. In the preferred form, the second sequential filter 104 provides a measurement error vector comprising $\phi'$, $\phi''$, $\Delta \rho$, and M. In the preferred form, the third sequential filter 122 provides a $\phi'$, $\Delta \rho$, and N measurement vector. The measurement selector 96 selects one of the measurement error vectors from the filters 104, 114, and 122 and outputs the selected measurement error vector as an output measurement error vector 98. The measurement vector from the first sequential filter 104 receives the correlations 80 as $D_P$ discriminations and provides a full measurement error vector $\phi$, $\phi'$, $\phi''$, $\Delta\rho$, and M.

The carrier phase and frequency errors and code phase errors are used to estimate the measurement error vector including the carrier phase error $\phi$, the carrier frequency error $\phi'$, the carrier phase acceleration error $\phi''$ that indicates the code phase error, the pseudorange error $\Delta\rho$, and the measurement covariance matrix M from the prefilter detection block 46. In operation, the prefilter detection block 46 examines the estimates and validity of the output of sequential filters 104, 114, and 122 to determine when any of the measurement error vector outputs should be forwarded to the navigation state estimator 48. In the case of the first sequential filter 114, the measurement error vector is complete having all of the $\phi$, $\phi'$, $\phi''$, $\Delta\rho$, and M error measurements because phase errors relate to frequency and code errors. In the case of the second sequential filter 114, the phase $\phi$ is a null value and the covariance vector M has the row and column corresponding to the variance of $\phi$ filled with a high uncertainty value so that phase $\phi$ measurement error is referenced as uncertain and the covariances of other estimates with $\phi$ are set to zero so that no inference about $\phi$ can be derived from the estimates of other quantities. That is, in the preferred form, the measurement vector from the second sequential filter 114 includes a meaningless null $\phi$ phase value with covariance matrix M filled in a respective location with an ultrahigh uncertainty value to render the null $\phi$ phase value uncertain because phase discrimination is lost during frequency discrimination. The third sequential filter 122 provides a null $\phi$ phase value and a null carrier phase acceleration error $\phi''$ value of the measurement error vector with a covariance matrix M filled in respective locations with the ultrahigh uncertainly value to render the $\phi$ phase value and the $\phi''$ carrier phase acceleration error value uncertain because phase discrimination is lost during code discrimination and the frequency discrimination is exceedingly noisy and practically useless. The covariance matrix M also has zeros placed in the non-diagonal elements of the rows and columns corresponding to the $\phi$ and $\phi''$, states. Consequently, no inference about $\phi$ and $\phi''$ can be drawn from elements of the measurement error vector which have lower uncertainties.

In addition to ultrahigh certainty values in the covariance matrix M of the measurement errors, the validity and confidence indicators are used to further indicate the ambiguity of the measurement errors. By way of example, the carrier phase validity indicator PLI has a value of 1 when the carrier phase error $\phi$ is considered valid and has a value of 0 when invalid. The prefilter detection block 46 outputs the phase validity confidence PLC that takes a value between 0 and 1 indicating a confidence level of PLI. The prefilter detection block 46 also outputs the carrier frequency validity indicator FLI that has a value of 1 when the carrier frequency error $\phi'$ is valid and has a value of 0 when invalid. The prefilter detection block 46 also outputs a carrier frequency confidence indicator FLC. The prefilter detection block 46 also outputs a code validity indicator CLI that has a value of 1 when the pseudorange error estimate $\Delta\rho$ is valid and a value of 0 when invalid. The prefilter detection block 46 also outputs a code confidence indicator CLC. For the confidences PLC, FLC and CLC, an output of 0 corresponds to no confidence and an output of 1 corresponds to certainty. For the validity indicators PLI, FLI, and CLI, an output of 1 indicates a valid lock and an output of 0 indicates an invalid lock. The navigation state estimator 48 receives a lock indicator and confidence vector 99 comprising PLI, PLC, FLI, FLC, CLI, CLC indicators and receives the measurement error vector 98 comprising $\phi$, $\phi'$, $\phi''$, $\Delta\rho$, and M, as well as the IMU samples 52 for generating the navigation solution comprising position and velocity P/V.

The navigation state estimator 48 receives the indicator vector including the PLI, PLC, FLI, FLC, CLI, and CLC indicators from the prefilter detection block 46 along with the prefilter residual estimates vector as measurement error. The estimator 48 also receives the covariance matrix M from the measurement prefilter detection block 46 for propagating the CEE and estimated SV outputs. The navigation state estimator 48 can be a conventional Kalman filter that is modified to process the measurement error vectors conditioned upon the validity and confidence indicators of the lock indicator and confidence vector 99. The carrier phase error measurement $\phi$ is processed when only PLI and PLC indicators indicate that the carrier phase error measurement $\phi$ is valid with at least a predetermined confidence. A carrier frequency error $\phi'$ is processed when FLI and FLC indicators indicate that the carrier frequency error measurement $\phi'$ is valid with at least a predetermined confidence. The pseudorange error $\Delta\rho$ is processed when the CLI and CLC indicators indicate that pseudorange error measurement $\Delta\rho$ is valid with at least a predetermined confidence. The code phase error is directly related to the pseudorange error $\Delta\rho$. The clock estimates CEE and state vector SV outputs of the navigation state estimator 48 are adjusted as the carrier phase error $\phi$, carrier frequency error $\phi'$, and pseudorange error $\Delta\rho$ vary. When the indicators PLI, FLI, CLI, PLC, FLC, and CLC indicate invalid or low confidence in the carrier phase error $\phi$, carrier frequency error $\phi'$, and pseudorange error $\Delta\rho$, the CEE and SV are statically propagated without updates, that is, CEE and SV are propagated without updates. When the PLI, PLC, FLI, FLC, CLI, and CLC indicators indicate validity and high confidence in the carrier phase error $\phi$, carrier frequency error $\phi'$, and pseudorange error $\Delta\rho$, the CEE and SV outputs from the navigation state estimator 48 are dynamically propagated using updates of the carrier phase error $\phi$, carrier frequency error $\phi'$, and pseudorange error measurements $\Delta\rho$.

In the preferred form, the dynamic and static propagation of the residuals and CEE and SV outputs by the navigation state estimator 48 occurs based upon the validity and confidence PLI, PLC, FLI, FLC, CLI, and CLC of the lock and confidence vector by predetermined criteria. When the indicators PLI and PLC for carrier phase error $\phi$ indicators PLI and PLC are valid with confidence, then the CEE and SV outputs are dynamically propagated using carrier phase error $\phi$, carrier frequency error $\phi'$, and pseudorange error $\Delta\rho$ residual estimates. When the PLI and PLC indicators for the carrier phase error $\phi$ are invalid and FLI and FLC indicators for the carrier frequency error $\phi'$ are valid with confidence, the CEE and SV outputs are dynamically propagated using the carrier frequency error $\phi'$ and pseudorange error $\Delta\rho$ residual estimates. When the PLI and PLC indicators for the carrier phase error $\phi$ is invalid and the FLI and FLC indicators for the carrier frequency error $\phi'$ are invalid and the indicators CLI and CLC for the code phase are valid with confidence, the CEE and SV outputs are dynamically propagated using the pseudorange range error $\Delta\rho$ residual estimate. When the indicators are invalid for the carrier phase error $\phi$, the carrier frequency $\phi'$ and code phase, the CEE and SV outputs are statically propagated without updates using the carrier phase error $\phi$, the carrier frequency error $\phi'$ and pseudorange error $\Delta\rho$ residual estimates. In this manner, the navigation state estimator 48 dynamically propagates the CEE and SV outputs for adjusting tracking of the code phase and carrier phase when the residual estimates are valid with confidence, and, the navigation state estimator 48 statically propagates the CEE and SV outputs for maintaining tracking of the code phase and carrier phase when the residual estimates are invalid. As such, the navigation processor 26 tracks with dynamic updates to the CEE and SV and consequently the carrier phase and code phase only when the residual estimates are valid. The SV output may contain an estimated ΔTEC and a position and velocity estimate. The decision to process the residual estimates $\phi$, $\phi'$, and $\Delta\rho$ by the navigation state estimator 48 is done as in conventional tightly coupled receivers that use outputs from conventional lock detectors to determine when to process the pseudorange range error $\Delta\rho$, carrier phase error $\phi$, and carrier frequency error $\phi'$ residual estimates.

The discriminators provide discriminations used to determine the measurement errors. In the case of the phase discriminator 100, the I&Q correlations 80 are to discriminate phase measurement errors where $D_P(k)$ are I&Q correlations 80. The frequency discriminator 101 receives the I&Q correlations 80 as inputs and transforms the I&Q correlations 80 into frequency discriminations $D_F(k)=I_P(k-1)Q_P(k)-I_P(k)Q_P(k-1)$. The code discriminator 102 receives the I&Q correlations 80 as inputs and transforms the I&Q correlations 80 into code discriminations $D_C(k)=I_E(k)^2+Q_E(k)^2-I_L(k)^2-Q_L(k)^2$.

The first sequential filter 104 receives the phase discriminations $D_P$ from phase discriminator passing the correlations 80 from the correlator 30, receives the frequency discriminations $D_F$ from the frequency discriminator 101, and receives the code discriminations from the code discriminator 102 and then produces phase measurement error vector comprising the carrier phase error $\phi$, the carrier frequency error $\phi'$, the carrier phase acceleration error $\phi''$, the pseudorange error $\Delta\rho$, and measurement covariance matrix M. The first observation lock detector 92 computes a first lock indicator and confidence vector comprising a carrier phase validity indicator PLI, a carrier phase confidence indicator PLC, a carrier frequency validity indicator FLI, a carrier frequency confidence indicator FLC, a code phase validity indicator CLI, and a code phase confidence indicator CLC. The first observation lock detector 90 outputs a first lock indicator and confidence vector 99 to the measurement selector 96. The first observation lock detector 90 receives the phase measurement error vector 98 from first sequential filter 104 along with the SNR and an A amplitude noise estimates 45 from the noise estimator 25 and the quadrature correlation signals 80.

The second sequential filter 114 receives as inputs the frequency discriminations $D_F$ from the frequency discriminator generator 101 and the code discrimination $D_C$ from the code discriminator 102. The second sequential filter 114 then produces frequency measurement error vector comprising the carrier phase error $\phi$, the carrier frequency error $\phi'$, the carrier phase acceleration error $\phi''$, the pseudorange error $\Delta\rho$, and measurement covariance matrix M. The second observation lock detector 92 receives the frequency measurement error vector from second sequential filter 114 along with the SNR and A noise estimates 45 from the noise estimator 25 and along with the quadrature correlation signals 80. The second observation lock detector 92 outputs a second lock indicator and confidence vector to the measurement selector 96. The second sequential filter 114 preferably does not compute the carrier phase error of the frequency measurement error vector. The second sequential filter 114 sets the carrier phase error $\phi$ to zero. The second sequential filter 114 fills diagonal elements of the covariance matrix M element corresponding to the variance of the carrier phase error $\phi$ to the large predetermined ultrahigh uncertainty value. Other elements in the row and column of the covariance matrix corresponding to the carrier phase error $\phi$ are set to zero.

The third sequential filter 122 receives as inputs the code discriminations $D_C$ from the code discriminator 102 and produces a code measurement error vector comprising the carrier phase error $\phi$, the carrier frequency error $\phi'$, the carrier phase acceleration error $\phi''$, the pseudorange error $\Delta\rho$, and measurement covariance matrix M. The third sequential filter 122 does not compute the carrier phase error $\phi$ or the carrier phase acceleration error $\phi''$ but sets $\phi$ and $\phi''$ both equal to zero. The diagonal element of the covariance matrix M corresponding to the carrier phase error $\phi$ is set to a first large predetermined ultrahigh uncertainty value. The diagonal element of the covariance matrix M corresponding to the carrier phase acceleration error $\phi''$ is set to a second large predetermined value. Other elements of M in the rows and columns corresponding to the carrier phase error $\phi$ and the carrier phase acceleration error $\phi''$ are set to zero. The carrier frequency error $\phi'$ produced by the third sequential filter 122 is not based upon carrier measurements, but is based on the code phase error rate and the fact that the code and carrier phases of the signal are generated coherently both at the satellite and the replica. The variance associated with the carrier frequency error will be much greater than that of the first or second sequential filter for the case where a good carrier frequency or carrier phase measurement is available. The third observation lock detector 94 receives code measurement error vector from the third sequential filter 122 along with the SNR and A noise estimates 45 from the noise estimator 25 and along with the quadrature correlation signals 80. The third observation lock detector 94 provides a third lock indicator and confidence vector comprising a carrier phase validity indicator PLI, a carrier phase confidence indicator PLC, a carrier frequency validity indicator FLI, a carrier frequency confidence indicator FLC, a code phase validity indicator CLI, and a code phase confidence indicator CLC. The third observation lock detector 94 outputs a third lock indicator and confidence vector to the measurement selector 96.

The measurement selector 96 receives as inputs the first lock indicator and confidence vector one from the first observation lock detector 90, a phase measurement error vector and phase measurement error covariance matrix from the first sequential filter 104. The measurement selector 96 also receives as inputs the second lock indicator and confidence vector from the second observation lock detector 92 and the frequency measurement error vector and frequency error covariance matrix from the second sequential filter 114. The measurement selector 96 also receives as inputs the third lock indicator and confidence vector from the third observation lock detector 94 and the code measurement error vector and code error covariance matrix from the third sequential filter 122. The measurement selector 96 outputs one of the phase, frequency, or code measurement error vectors 98, and outputs a respective one of the first, second, or third lock indicator and confidence vectors 99. The selection of the phase, frequency, and code measurement error vector and the selection of the first, second, or third indicator and confidence vector can be had by logical processing and rapid threshold determinations for the selection.

When PLC from first observation lock detector 90 exceeds a predetermined first threshold, then the phase measurement error vector output from the measurement selector 96 is equal to the values of $\phi$, $\phi'$, $\phi''$, M, $\Delta\rho$ from phase measurement error vector from the first sequential filter 104. The measurement selector 96 also outputs the first lock indicator and confidence vector, which equals lock indicator and confidence vector from the first lock detector 90. This first lock indicator and confidence vector comprises the six indicators PLI, PLC, FLI, FLC, CLI, CLC.

When the PLC of the first lock indicator and confidence vector from the first observation lock detector 90 is less than the predetermined first threshold, and the FLC indicator of the second lock indicator and confidence vector is greater than a predetermined second threshold, then the measurement selector 96 outputs the frequency measurement error vector with values of $\phi$, $\phi'$, $\phi''$, M, $\Delta\rho$ that are equal to that of frequency measurement error vector one from the second sequential filter 114. Under these conditions the measurement selector 96 also outputs a lock indicator and confidence vector comprised of the terms PLI, PLC, FLI, FLC, CLI, CLC. The values of PLI, PLC, FLI, FLC, CLI, CLC are those from the second lock indicator and confidence vector from the second observation lock detector 92.

When the PLC term of lock indicator and confidence vector one is less than the predetermined first threshold and the FLC indicator from second lock indicator and confidence vector is less than the predetermined second threshold, then the measurement selector 96 outputs a measurement error vector comprised of the terms $\phi$, $\phi'$, $\phi''$, M, $\Delta\rho$. The values of the terms in the measurement error vector are equal to the values of the code measurement error vector that is outputted from the third sequential filter 122. Under these same conditions, the measurement selector 96 also outputs the third lock detector and confidence vector comprising the PLI, PLC, FLI, FLC, CLI, CLC indicators. The indicators of the lock detector and confidence vector 99 output from the measurement selector 96 is equal to the third lock detector and confidence vector from the third observation lock detector 94.

Figure 4:
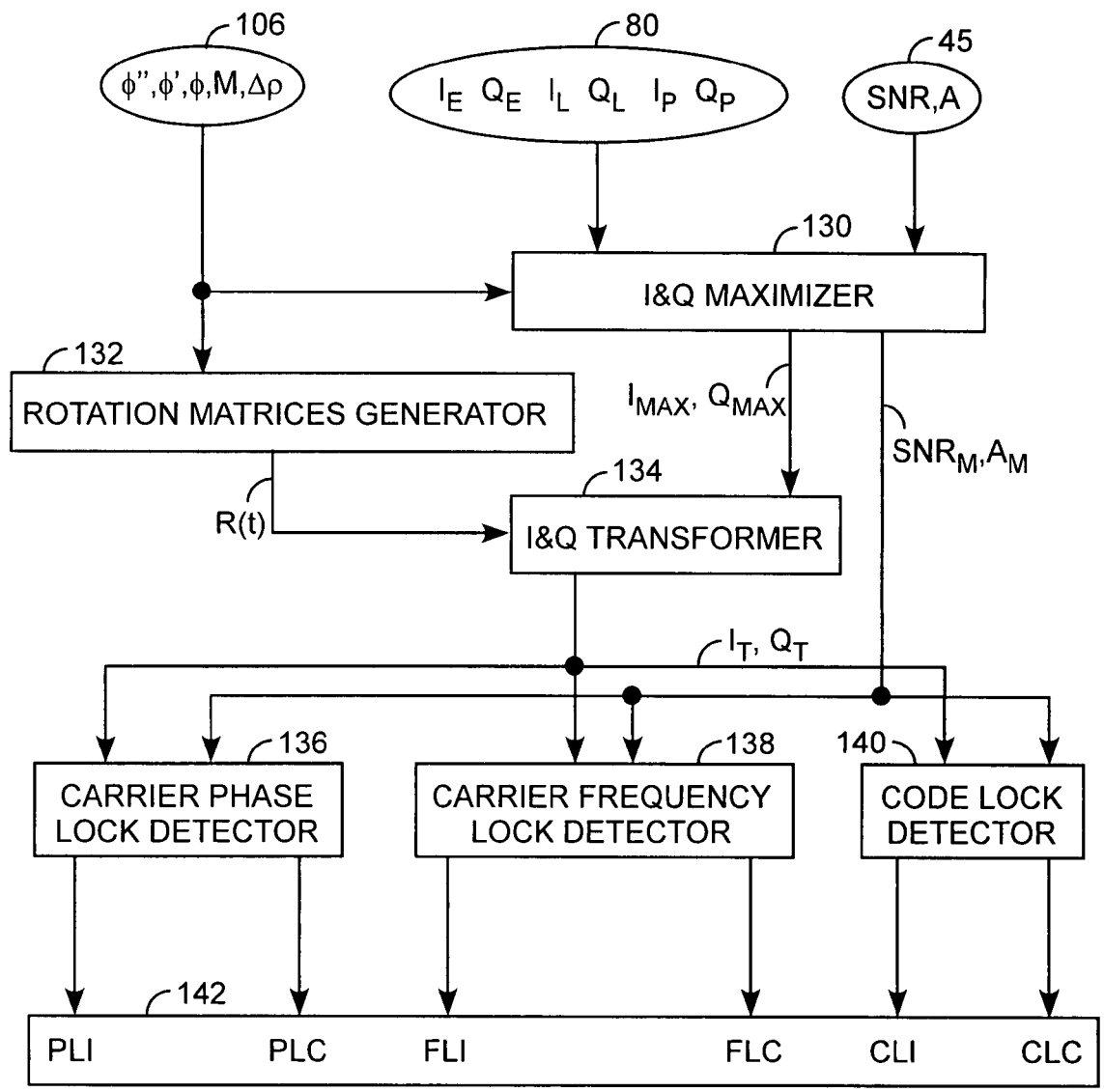
FIG. 4 is a block diagram of an observation lock detector.

Referring to FIGS. 1, 2, 3, and 4, and more particularly to FIG. 4, the first observation lock detector 90, second observation lock detector 92, and third observation lock detector 94 can be made identical to each other. The observation lock detectors 90, 92, and 94 receive a measurement error vector $\phi$, $\phi'$, $\phi''$, $\Delta\rho$, and M for generating indicator vectors. A observation lock detector includes a I&Q maximizer 130, a rotation matrices generator 132, an I&Q transformer 134, a carrier phase lock detector 136, a carrier frequency lock detector 138, and a code lock detector 140

The I&Q maximizer 130 that receives the measure error vector as a residual estimate vector including $\phi$, $\phi'$, $\phi''$, $\Delta\rho$, M from a sequential filter 104, 114, 122, receives the SNR and A noise estimates 45 from the noise estimator 25, and receives the I&Q correlations 80 from the correlator 40 for generating $I_{MAX}$ and $Q_{MAX}$ maximized quadrature vector. $I_{MAX}$ and $Q_{MAX}$ maximized quadrature vector is generated by combining weighted sums of the $I_E$, $I_P$, and $I_L$ correlations into a maximized inphase vector $I_{max}$ and by combining weighted sums of $Q_E$, $Q_P$, and $Q_L$ correlations into a quadrature maximized vector $Q_{max}$, for each sample time t. The weights $W_1$, $W_2$, and $W_3$ are chosen so that the $I_{max}$ and $Q_{max}$ maximized quadrature signals have the maximum SNR for each sample time t. By forming $I_{max}$ and $Q_{max}$ maximized quadrature signals, the maximizer 130 is diminishing the effect of signal power loss during correlation when the prompt inphase signal $I_P$ is no longer aligned with the peak of the autocorrelation function of the spreading code. The I&Q maximizer 130 also computes the average signal to noise ratio of $I_{max}$ and $Q_{max}$ maximized quadrature vector by providing the modified $SNR_M$ signal as well as the average signal amplitude $A_M$ of the $I_{max}$ and $Q_{max}$ maximized quadrature signals. The I&Q maximizer 130 outputs $I_{max}$ and $Q_{max}$ maximized quadrature vector and as well as scalar modified noise estimates $SNR_M$ and $A_M$.

The rotation matrices generator 132 receives the residual estimates vector including $\phi$, $\phi'$, $\phi''$, $\Delta\rho$ and generates a rotational matrix array R. The rotational matrix array R corresponds to rotating in reverse an amount equal to the instantaneous carrier phase error also called the carrier phase offset angle $\beta(t)$ at each sample time t in the epoch T. The carrier phase offset angle $\beta(t)$ is estimated at each sample time using the value of the estimated measurement error residuals $\phi$, $\phi'$, $\phi''$, along with the time between samples. The rotation matrices generator 132 operates concurrently with the I&Q maximizer 130.

The I&Q transformer 134 receives the rotational matrix array R from the rotation matrices generator 132 and receives the $I_{Max}$ and $Q_{Max}$ maximized signals from the I&Q maximizer 130 for rotating in reverse the maximized vector $I_{max}$ and $Q_{max}$ an amount equal to the carrier phase offset angle $\beta(t)$ at each sample time t in the epoch T for generating the transformed quadrature vector denoted by $I_T$ & $Q_T$. the I&Q transformer 134 premultiplies a column vector containing $I_{Max}(t)$ and $Q_{Max}(t)$ maximized quadrature signals by a rotation matrix R(t) to produce $I_T(t)$ and $Q_T(t)$ transformed quadrature signals. The I&Q transformer 134 then combines the $I_T(t)$ and $Q_T(t)$ transformed quadrature signals for each sample time t to produce $I_T$ and $Q_T$ transformed vectors. The $I_T$ and $Q_T$ or transformed vector and the modified noise estimates $SNR_M$ and $A_M$ are then communicated to conventional lock detectors 136, 138, and 140.

The conventional lock detectors include the carrier phase output lock detector 136 providing the PLI and PLC indicators, the carrier frequency lock detector 138 providing the FLI and FLC indicators, and a code lock output detector 140 providing the CLI and CLC indicators. The output lock detectors 136, 138, and 140 provide a PLI, PLC, FLI, FLC, CLI, and CLC indicator vector 142 indicating the validity and confidence of the carrier phase error $\phi$, carrier frequency error $\phi'$, and code phase that is related to the pseudorange error $\Delta\rho$.

The carrier phase lock detector 136 is a conventional carrier phase lock detector, which receives as input the $I_T$ and $Q_T$ transformed quadrature vector and the modified noise estimates $SNR_M$ and $A_M$. The carrier phase lock detector 136 outputs an indicator PLI that is 1 when the carrier phase is in lock and 0 when not in lock. The carrier phase lock detector 136 outputs the indicator PLC that takes a value between 0 and 1 expressing the confidence in the correctness of the value of indicator PLI. The carrier frequency lock detector 138 is a conventional carrier frequency lock detector that receives as input the $I_T$ and $Q_T$ transformed quadrature vector and the modified noise estimates $SNR_M$ and $A_M$.

The carrier frequency lock detector 138 outputs the indicator FLI that is 1 when the carrier frequency is in lock and 0 when not in lock. The carrier frequency lock detector 78 outputs the indicator FLC that takes a value between 0 and 1 indicating the confidence in the correctness of the value of indicator FLI. The code lock detector 140 is a conventional code lock detector that receives as input the $I_T$ and $Q_T$ transformed vector and the modified noise signal $SNR_M$ and $A_M$. The code lock detector 140 outputs the indicator CLI that is 1 when the code is in lock and 0 when not in lock. The code lock detector 140 outputs the indicator CLC that takes a value between 0 and 1 expressing the confidence in the correctness of the value of the indicator CLI.

Figure 5:
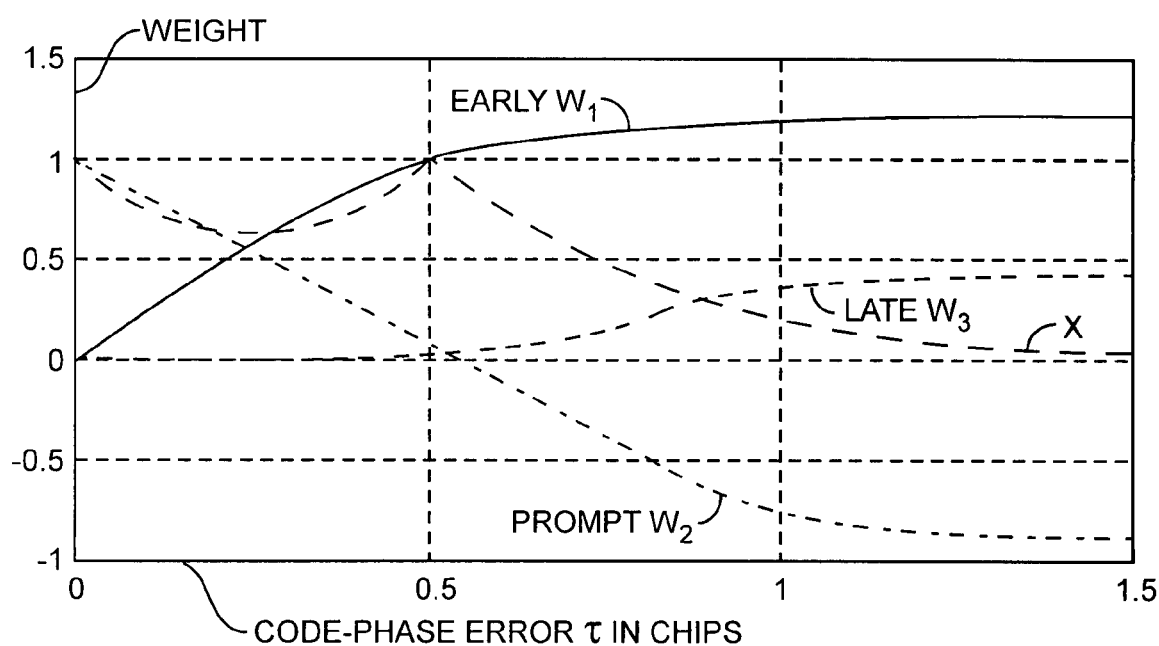
FIG. 5 is a plot of an early weight, a prompt weight, a late weight, and a degradation factor stored in an I&Q maximizer look up table.
Figure 6:
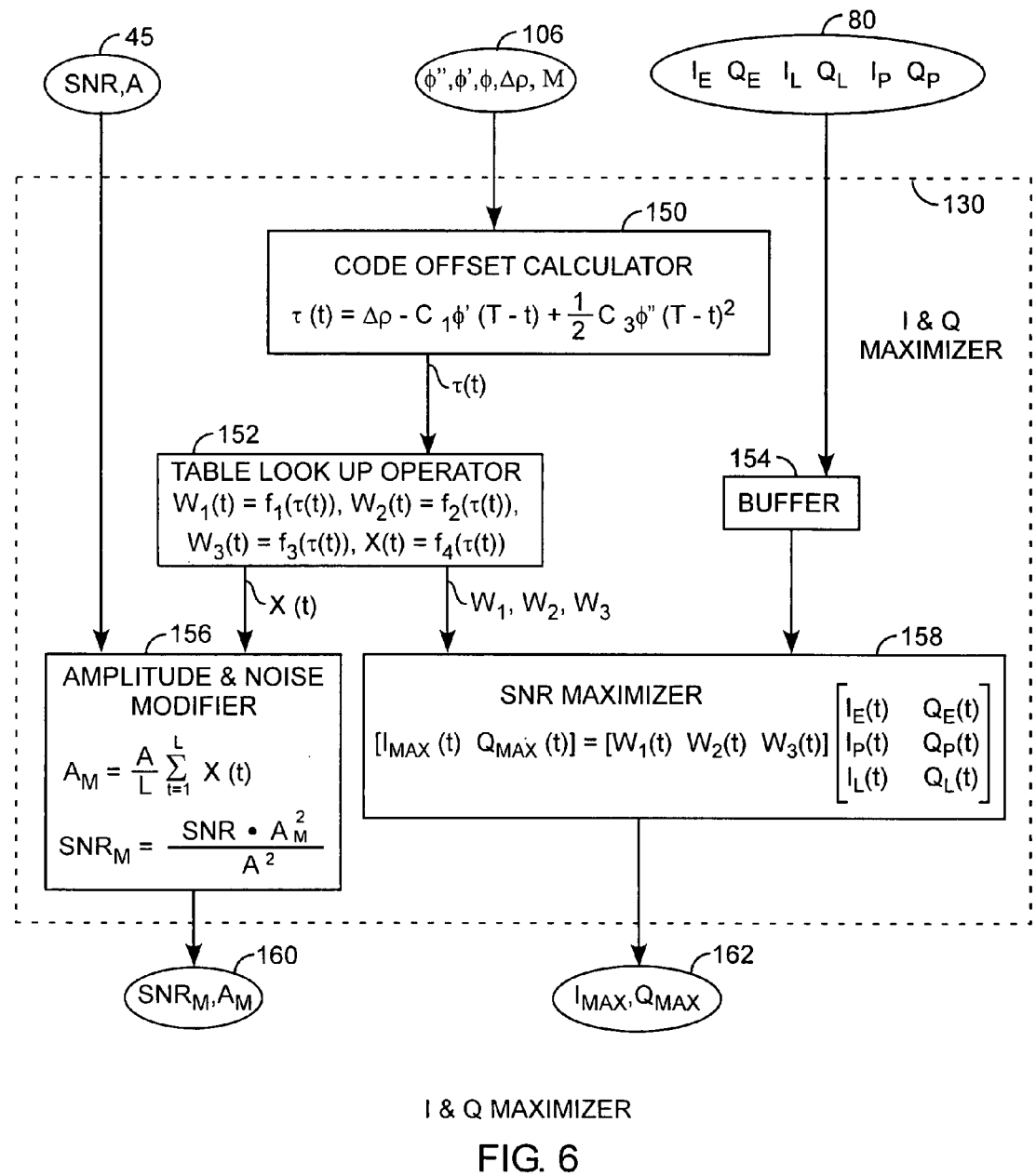
FIG. 6 is a block diagram of an I&Q maximizer.

Referring to FIGS. 1 through 6, and more particularly to FIGS. 5, and 6, the I&Q maximizer 130 includes a code offset calculator 150 receiving the residual estimates vector $\phi$, $\phi'$, $\phi''$, $\Delta\rho$, M from one of the sequential filters 104, 114, and 122. The code offset calculator 150 computes an estimate of the code phase offset $\tau(t)$ for each sample time t, where $\tau(t) = \Delta\rho -$ $C_1[\phi'(T-t)-(\frac{1}{2})(\phi''(T-t)^2)]$ with $C_1=c/2\pi f_{CAR}$ where c and C1 are constants and c is the speed of light and $f_{CAR}$ is the carrier frequency that is equal to the reference $f_o$. The code phase offset vector containing the estimated code phase offset for all sample times in the epoch is given by the code phase offset vector τ. The code phase offset vector τ is the output of the code offset calculator 150.

The I&Q maximizer 130 also includes a buffer 154 that receives early, prompt, and late I&Q quadrature correlations 80 for an epoch time T and combines the correlations 80 into a buffered $I_B$ and $Q_B$ vector containing all the early, prompt, and late I&Q quadrature correlations 80 for the entire epoch. Individual quadrature correlations I(t) and Q(t) are buffered as the $I_B$ and $Q_B$ buffered vector. The $I_B$ and $Q_B$ vector containing all the early, prompt, and late I&Q quadrature correlations 80 for the entire epoch T are the outputs of the buffer 154.

The I&Q maximizer 130 also includes a look up table operator 152 that receives the code phase offset vector τ and looks up the early, prompt, and late weights $W_1(t)$, $W_2(t)$, and $W_3(t)$, respectively, that combine the early, prompt, and late I(t) and Q(t) correlations 80 to maximize the signal-to-noise ratio at each correlation at time t. The I&Q maximizer look up table is used by the look up table operator 152 to determine the weights W1, W2, and W3 respective for early, prompt, and late I&Q correlations. The look up table operator 152 also calculates a degradation factor X(t) that indicates the fraction of signal amplitude lost when the prompt replica is aligned in time with the autocorrelation peak of the code used. The look up table operator 152 uses the look up table for determining the degradation factor. The look up table operator 152 outputs vectors X, $W_1$, $W_2$, and $W_3$ that contain the degradation factor X and W weights for every sample time t in the epoch T.

The I&Q maximizer 130 also includes a SNR maximizer 158 that receives the weights $W_1$, $W_2$, and $W_3$ weight vectors from the look up table operator 152 and the $I_B$ and $Q_B$ vectors from the buffer 154 and performs a weighted sum of the early, prompt and late correlations 80 for each sample time t to produce the maximized signals $I_{Max}(t)$ and $Q_{Max}(t)$. The individual samples are then stored in vectors denoted by, $I_{Max}$ and $Q_{Max}$, which the SNR maximizer 158 then outputs. The vectors, $I_{Max}$ and $Q_{Max}$, are also outputs of the I&Q maximizer 130. The I&Q maximizer 130 also includes a noise modifier 156, which receives the degradation factor vector X, and the signal to noise ratio SNR, and the amplitude A as inputs and outputs the modified signal to noise ratio $SNR_M$ and the modified amplitude $A_M$. The modified signal to noise ratio $SNR_M$ and the modified amplitude $A_M$ are also outputs of the I&Q maximizer 130, where $SNR_M = SNR \cdot A_M^2/A^2$ and $A_M = (A/N)\Sigma_{t-1}^N X(t)$, and where N is the number of samples in an epoch.

Figure 7:
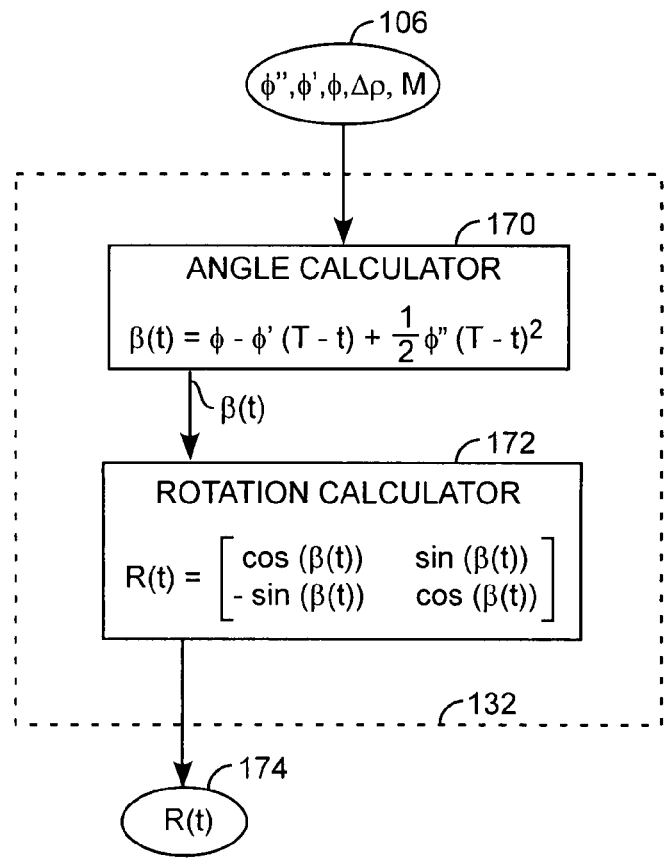
FIG. 7 is a block diagram of a rotation matrices generator.
Figure 8:
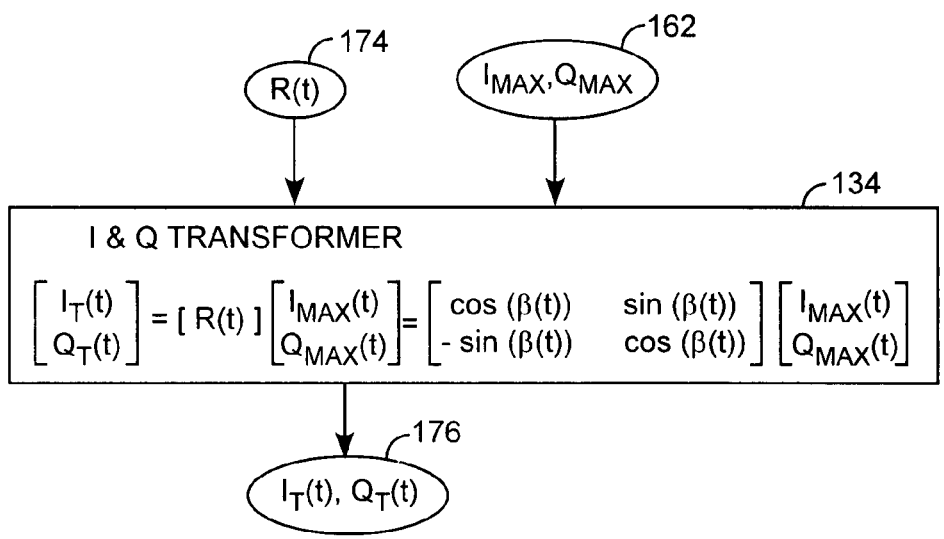
FIG. 8 is a block diagram of an I&Q transformer.

Referring to all of the Figures, and more particularly to FIGS. 7 and 8, the rotation matrices generator 132 includes an angle calculator 170 receiving the residual estimates vector containing φ, φ', φ", Δρ, from one of the sequential filters 104, 114, and 122. The angle calculator 170 computes an estimate of the carrier phase offset angle β(t) for each sample time t. A carrier phase offset angle vector β containing the estimated carrier phase offset angles β(t) for all sample times t in the epoch T, is an output of the angle calculator 170 where β(t) $=\phi-\phi'(T-t)+(\frac{1}{2})(\phi''(T-t)^2)$. The rotation matrices generator 132 also includes a rotation calculator 172 that receives the carrier offset vector β as an input. For each sample time t, rotation calculator 172 generates a rotation matrix R(t) which corresponds to a rotation designed to reverse the effect of the estimate of the carrier phase offset β(t). The rotation matrices R(t), are grouped together in the rotational matrix array R as an output of the rotation calculator 172 as well as the rotation matrices generator 132. The I&Q transformer 134 receives the rotation matrices R(t) from the rotation matrices generator 132 and the IMAX & QMAX maximized quadrature signals from the I&Q maximizer and provides the $I_T$ and $Q_T$ quadrature transformed signals using a matrix wise transformation equation.

$$\begin{bmatrix} I_T(t) \\ Q_T(t) \end{bmatrix} = [R(t)] \begin{bmatrix} I_{MAX}(t) \\ Q_{MAX}(t) \end{bmatrix} = \begin{bmatrix} \cos(\beta(t)) & \sin(\beta(t)) \\ -\sin(\beta(t)) & \cos(\beta(t)) \end{bmatrix} \begin{bmatrix} I_{MAX}(t) \\ Q_{MAX}(t) \end{bmatrix}$$

In operation, the observation lock detectors 90, 92, and 94 determine the validity and confidences of the lock indicator and confidence vector 142 from residual error estimates for the carrier phase error φ, carrier frequency error φ', carrier phase error acceleration φ", and pseudorange error Δρ. These indicators 142 are preferably used by the navigation state estimator 48 in the navigation processor 26 so that the invalid residual estimates are not used to dynamically propagate navigation signals, such as clock error estimates CEE and other corrections to the state vector SV that are used to adjust the carrier phase and code phase during coherent carrier demodulation and code despreading of the samples 30. The observation lock detectors 90, 92, and 94 detect invalid residual estimates from the sequential filters 104, 114, and 122 so that the navigation state estimator 48 does not use residual estimates. The observation detectors 90, 92, and 94 deweight the residual estimates with low validity and confidence levels so that the residual estimates are effectively declared invalid. These validity and confidence indicators 142 can be used as a measurement of performance of an ultratightly coupled navigation system. The observation lock detectors 90, 92, and 94 can be used to determine the validity of measurement error vector of the received I&Q quadrature correlations 80.

In the rotator 142, the carrier phase error φ is a carrier phase error at a time t at the end of an epoch T when T=t. The carrier phase offset angle β(t) is the carrier phase error at any time t. That is, the carrier phase offset angle β(t) equals the carrier phase error at the time t in the epoch. When t=T then the carrier phase offset angle β(T) is equal to the carrier phase error φ. Each matrix R(t) of the rotational array R is defined by respective times t within the epoch. As such, the rotational array R indicates the carrier phase offset angle β(t) at a point in the epoch. The matrix R(T) corresponds to a rotation designed to offset the carrier phase offset angle β(T), which is equal to the carrier phase error φ.

In the maximizer 130, the code phase error τ is determined by the code offset calculator 150 for looking up the weights W and degradation vector X by the look up table operator 152. The look up table is used to determine the weights W and vector X from code phase offset τ. The SNR maximizer 158 then generates the maximized vector $I_{MAX}$ and $Q_{MAX}$ 162 from the buffered quadrature correlations $I_B$ & $Q_B$. The $I_{MAX}$ and $Q_{MAX}$ maximized quadrature correlation vector has a maximized SNR at each time t. Concurrently, the noise amplitude A is modified into the modified amplitude $A_M$ using the degradation vector X. The modified amplitude $A_M$ represents the degraded amplitude of the I&Q quadrature correlations 80. The modified $SRN_M$ is the SNR of the $I_{MAX}$ and $Q_{MAX}$ maximized vector that is averaged over the epoch. The modified amplitude $A_M$ is the average amplitude of $I_{MAX}$ and $Q_{MAX}$ 162 over the epoch. Rotating $I_{MAX}$ and $Q_{MAX}$ maximized quadrature correlation vector by the rotational array R removes the carrier phase offset over time t. The $I_T$ and $Q_T$ transformed quadrature correlation vector includes maximized $I_{MAX}(t)$ and $Q_{MAX}(t)$ quadrature correlations having the carrier phase offset angle β(t) rotated out so that the $I_T$ inphase maximized vector is maximized and $Q_T$ quadrature maximized vector is minimized.

During precise prompt correlations by the correlator 40, the prompt correlations have a peak prompt SNR. When there is a code phase offset τ between the prompt replica code of the code generator 42 and the spread spectrum code of the $I_Z$ and $Q_Z$ carrier demodulated signals, the prompt correlation amplitude level is degraded from the peak prompt SNR. The modified $SNR_M$ and amplitude $A_M$ are used by the detectors 136, 138, and 140 to account for the amplitude and Signal to Noise ratio loss due to the prompt code replica not being aligned with the code phase of the $I_Z$ and $Q_Z$ carrier demodulated signals When all of the residual estimates are accurate, that is, valid with high confidence, the $I_T$ inphase transformed quadrature correlation vector contains all of the signal power and the $Q_T$ quadrature transformed vector contains almost no signal power. When the $I_T$ inphase transformed quadrature correlation vector contains almost all of the signal power, and the noise has not overwhelmed the signal, the carrier phase output lock detectors 90, 92, and 94 provide valid and confident indicators PLI and PLC, the carrier frequency output lock detector 138 provides valid and confident indicators FLI and FLC, and the code phase output lock detector 140 provides valid and confident indicators CLI and CLC. When the noise is not insurmountably greater than the signal and the carrier phase φ residual estimate is not accurate, and the carrier frequency φ' residual estimate is accurate, and the pseudorange error residual estimate is accurate, and when the $I_T$ inphase transformed quadrature correlation vector and the $Q_T$ quadrature transformed quadrature correlation vector both contain roughly constant signal power having a sum greater than a predetermined power value that is dependent upon $SNR_M$ and $A_M$, the carrier phase output lock detector 136 provides invalid or unconfident indicators PLI and PLC, the carrier frequency output lock detector 138 provides valid and confident indicators FLI and FLC, and the code phase output lock detector 140 provides valid and confident indicators CLI and CLC.

When the noise is not insurmountably greater than the signal and the carrier phase φ and carrier frequency φ' residual estimates are inaccurate and the pseudorange error residual estimate Δρ is accurate. When the sum of the power of $I_T$ inphase transformed quadrature correlation vector and the $Q_T$ transformed quadrature correlation vector is above the predetermined power value, the carrier phase output lock detector 90, 92, and 94 provides invalid and unconfident indicators PLI and PLC, the carrier frequency output lock detector 138 provides invalid and unconfident indicators FLI and FLC, and the code phase output lock detector 140 provides valid and confident indicators CLI and CLC.

When all of the residual estimates φ, φ', and Δρ are inaccurate, the carrier phase output lock detector 136 provides invalid and unconfident indicators PLI and PLC, the carrier frequency output lock detector 138 provides invalid and unconfident indicators FLI and FLC, and the code phase output lock detector 140 provides invalid and unconfident indicators CLI and CLC.

The observation lock detectors 90, 92, and 94 function to provide an operational indication vector 142 for detecting invalid residuals. The observation lock detectors 90, 92, and 94 generate a code phase offset τ and a carrier angle offset β from the measurement error vectors from the filters 104, 114, and 122 and from the correlations 80. The code phase offset τ is used to combine the early, prompt, and late correlations 80 into the I&Q maximized quadrature correlation vector for adjusting the I&Q quadrature correlations for power alignment relative to code phase. The carrier angle offset β vector then is used to rotate the $I_{MAX}$ and $Q_{MAX}$ maximized quadrature correlation vector to align signal power relative to carrier phase resulting in the $I_T$ and $Q_T$ transform vector that is the best estimate of what $I_P$ and $Q_P$ quadrature correlations would have been if the replica had been corrected by the estimates of the error in the residual error estimate vector as determined by the measurement error vector from the filters 104, 114, and 122. The lock detectors 136, 138, and 140 determined validity of the residuals of the measurement error vectors from the filters 104, 114, and 122 for the received I&Q quadrature correlations 80. In effect, the observation lock detectors 90, 92 and 94 function to provide indicators 142 of the validity of the residual measurements in the measurement error vectors from the filters 104, 114, and 122, and as such, the observation lock detectors function to provide a performance metric of the desired correct operation of each of the sequential filters 104, 114, and 122 that generate the measurement error vectors from the correlations 80.

It should now be apparent that various alternative implementations can be used. The I&Q maximizer 130 could be modified to select at each time the early prompt or late I&Q quadrature correlations that the residual error estimate vector predicts have the greatest signal to noise ratio so that the modified amplitude estimate and SNR can be computed consistently. The I&Q maximizer 130 could be removed altogether and the prompt I&Q quadrature correlations could be used instead. The lock indicators 136, 138, and 140 can be used for indicating changes in the validity in the pseudorange error Δρ, pseudorange rate ρ̇, and pseudorange acceleration ρ̈ instead of carrier phase error φ, carrier frequency error φ', and code phase offset τ. Also, one or more of the lock detectors 136, 138, and 140 can be removed yielding a reduced set of indicators. The observation lock detectors 90, 92, and 94 could be applied to various types of spread spectrum signals such as the m-code signal. The observation lock detector 90, 92, and 94 can take inputs from additional correlators. The observation lock detectors 90, 92, and 94 can take positioning signal transmitted from a satellite and having a carrier modulated by any chipping code that maybe an m-code having an m-code envelope.

The organization of the prefilter detection block 46 can be changed using various filtering methods. Additional discriminators can be added or existing discriminators can be replaced, augmented, or deleted. More sequential filters operating on various combinations of discriminators can be added, and the existing sequential filters can be kept or removed. The invention is directed to a combination of sequential filters and lock detectors offering selection of the best computed residuals for navigation state propagation. Those skilled in the art can make enhancements, improvements, and modifications to the invention, and these enhancements, improvements, and modifications may nonetheless fall within the spirit and scope of the following claims.

What is claimed is:
1. A detection block for receiving correlations and providing a selected measurement error vector and a selected indication vector, the detection block comprising,
    discriminators for receiving correlations and providing discriminations,
    sequential filters for receiving the discriminations and providing measurement error vectors, observation detectors for receiving correlations and the measurement error vectors and providing indication vectors, and a selector for selecting one of the measurement error vectors as a selected measurement error vector and for selecting one of the indication vectors as a selected indication vector, wherein, the discriminators comprise a phase discriminator, a carrier frequency discriminator, and a code discriminator, the discriminations comprise phase discriminations, carrier frequency discriminations, and code discriminations, the correlations are $I_E$, $Q_E$, $I_P$, $Q_P$, $I_L$, and $Q_L$ correlations, the sequential filters are a first sequential filter for receiving the phase discriminations and providing a first measurement error vector, a second sequential filter for receiving the frequency discriminations and providing a second measurement error vector, and a third sequential filter for receiving the code discriminations and providing a third measurement error vector, the measurement error vectors comprising the first measurement error vector and the second measurement error vector and the third measurement error vector, each measurement error vector comprises a pseudorange error $\Delta\rho$ residual, a carrier phase error $\phi$ residual, a carrier frequency error $\phi'$ residual, a carrier phase acceleration error $\phi''$ residual, and a measurement covariance matrix M, and each indication vector comprises a carrier phase validity indicator PLI, a carrier phase confidence indicator PLC, a carrier frequency validity indicator FLI, a carrier frequency confidence indicator FLC, a code phase validity indicator CLI, and a code phase confidence indicator CLC.

2. The detection block of claim 1, wherein the detection block is for receiving correlations and providing a selected measurement error vector and a selected indication vector in an ultratight coupling navigation receiver.

3. The detection block of claim 1 wherein, the observation detectors are for receiving noise estimates and providing the indication vectors based on the received correlations, measurement error vectors, and noise estimates.

4. A detection block for receiving correlations and providing a selected measurement error vector and a selected indication vector, the detection block comprising, discriminators for receiving correlations and providing discriminations, sequential filters for receiving the discriminations and providing measurement error vectors, observation detectors for receiving correlations and the measurement error vectors and providing indication vectors, and a selector for selecting one of the measurement error vectors as a selected measurement error vector and for selecting one of the indication vectors as a selected indication vector, wherein, the discriminators comprise a phase discriminator, a carrier frequency discriminator, and a code discriminator, the discriminations comprise phase discriminations, carrier frequency discriminations, and code discriminations, the correlations are $I_E$, $Q_E$, $I_P$, $Q_P$, $I_L$, and $Q_L$ correlations, the sequential filters are a first sequential filter for receiving the phase discriminations and providing a first measurement error vector, a second sequential filter for receiving the frequency discriminations and providing a second measurement error vector, and a third sequential filter for receiving the code discriminations and providing a third measurement error vector, the measurement error vectors comprising the first measurement error vector and the second measurement error vector and the third measurement error vector, each measurement error vector comprises a pseudorange error $\Delta\rho$ residual, a carrier phase error $\phi$ residual, a carrier frequency error $\phi'$ residual, a carrier phase acceleration error $\phi''$ residual, and a measurement covariance matrix M, each indication vector comprises a carrier phase validity indicator PLI, a carrier phase confidence indicator PLC, a carrier frequency validity indicator FLI, a carrier frequency confidence indicator FLC, a code phase validity indicator CLI, and a code phase confidence indicator CLC, the carrier phase error $\phi$ residual of the second measurement error vector is uncertain and indicated as uncertain by the measurement covariance matrix M of the second measurement error vector, and the selected measurement error vector comprises an uncertain carrier phase error $\phi$ residual indicated by the carrier phase validity indicator PLI and the carrier phase confidence indicator PLC of the selected indication vector.

5. A detection block for receiving correlations and providing a selected measurement error vector and a selected indication vector, the detection block comprising, discriminators for receiving correlations and providing discriminations, sequential filters for receiving the discriminations and providing measurement error vectors, observation detectors for receiving correlations and the measurement error vectors and providing indication vectors, and a selector for selecting one of the measurement error vectors as a selected measurement error vector and for selecting one of the indication vectors as a selected indication vector, wherein, the discriminators comprise a phase discriminator, a carrier frequency discriminator, and a code discriminator, the discriminations comprise phase discriminations, carrier frequency discriminations, and code discriminations, the correlations are $I_E$, $Q_E$, $I_P$, $Q_P$, $I_L$, and $Q_L$ correlations, the sequential filters are a first sequential filter for receiving the phase discriminations and providing a first measurement error vector, a second sequential filter for receiving the frequency discriminations and providing a second measurement error vector, and a third sequential filter for receiving the code discriminations and providing a third measurement error vector, the measurement error vectors comprising the first measurement error vector and the second measurement error vector and the third measurement error vector, each measurement error vector comprises a pseudorange error $\Delta\rho$ residual, a carrier phase error $\phi$ residual, a carrier frequency error $\phi'$ residual, a carrier phase acceleration error $\phi''$ residual, and a measurement covariance matrix M, each indication vector comprises a carrier phase validity indicator PLI, a carrier phase confidence indicator PLC, a carrier frequency validity indicator FLI, a carrier frequency confidence indicator FLC, a code phase validity indicator CLI, and a code phase confidence indicator CLC, the carrier phase error $\phi$ residual and carrier phase acceleration error $\phi''$ of the third measurement error vector is uncertain and indicated as uncertain by the measurement covariance matrix M of the third measurement error vector, and the selected measurement error vector comprises an uncertain carrier phase error $\phi$ residual and an uncertain carrier phase acceleration error $\phi''$ as indicated by the carrier phase validity indicator PLI, the carrier phase confidence indicator PLC, the code phase validity indicator CLI, and the code phase confidence indicator CLC of the selected indication vector.

6. A detection block for receiving correlations and providing a selected measurement error vector and a selected indication vector, the detection block comprising, discriminators for receiving correlations and providing discriminations, sequential filters for receiving the discriminations and providing measurement error vectors, observation detectors for receiving correlations and the measurement error vectors and providing indication vectors, and a selector for selecting one of the measurement error vectors as a selected measurement error vector and for selecting one of the indication vectors as a selected indication vector, wherein, the discriminators comprise a phase discriminator, a carrier frequency discriminator, and a code discriminator, the discriminations comprise phase discriminations, carrier frequency discriminations, and code discriminations, the correlations are $I_E$, $Q_E$, $I_P$, $Q_P$, $I_L$, and $Q_L$ correlations, the sequential filters are a first sequential filter for receiving the phase discriminations and providing a first measurement error vector, a second sequential filter for receiving the frequency discriminations and providing a second measurement error vector, and a third sequential filter for receiving the code discriminations and providing a third measurement error vector, the measurement error vectors comprising the first measurement error vector and the second measurement error vector and the third measurement error vector, each measurement error vector comprises a pseudorange error $\Delta\rho$ residual, a carrier phase error $\phi$ residual, a carrier frequency error $\phi'$ residual, a carrier phase acceleration error $\phi''$ residual, and a measurement covariance matrix M, each indication vector comprises a carrier phase validity indicator PLI, a carrier phase confidence indicator PLC, a carrier frequency validity indicator FLI, a carrier frequency confidence indicator FLC, a code phase validity indicator CLI, and a code phase confidence indicator CLC, the carrier phase error $\phi$ residual of the second measurement error vector is uncertain and indicated as uncertain by the measurement covariance matrix M of the second measurement error vector, the selected measurement error vector comprises an uncertain carrier phase error $\phi$ residual indicated by the carrier phase validity indicator PLI and the carrier phase confidence indicator PLC of the selected indication vector, the carrier phase error $\phi$ residual and carrier phase acceleration error $\phi''$ of the third measurement error vector is uncertain and indicated as uncertain by the measurement covariance matrix M of the third measurement error vector, and the selected measurement error vector comprises an uncertain carrier phase error $\phi$ residual and an uncertain carrier phase acceleration error $\phi''$ as indicated by the carrier phase validity indicator PLI, the carrier phase confidence indicator PLC, the code phase validity indicator CLI, and the code phase confidence indicator CLC of the selected indication vector.

7. A detection block for receiving correlations and providing a selected measurement error vector and a selected indication vector, the detection block comprising, discriminators for receiving correlations and providing discriminations, sequential filters for receiving the discriminations and providing measurement error vectors, observation detectors for receiving correlations and the measurement error vectors and providing indication vectors, and a selector for selecting one of the measurement error vectors as a selected measurement error vector and for selecting one of the indication vectors as a selected indication vector, wherein, the discriminators comprise a phase discriminator, a carrier frequency discriminator, and a code discriminator, the discriminations comprise phase discriminations, carrier frequency discriminations, and code discriminations, the correlations are $I_E$, $Q_E$, $I_P$, $Q_P$, $I_L$, and $Q_L$ correlations, the sequential filters are a first sequential filter for receiving the phase discriminations and providing a first measurement error vector, a second sequential filter for receiving the frequency discriminations and providing a second measurement error vector, and a third sequential filter for receiving the code discriminations and providing a third measurement error vector, the measurement error vectors comprising the first measurement error vector and the second measurement error vector and the third measurement error vector, each measurement error vector comprises a pseudorange error $\Delta\rho$ residual, a carrier phase error $\phi$ residual, a carrier frequency error $\phi'$ residual, a carrier phase acceleration error $\phi''$ residual, and a measurement covariance matrix M, each indication vector comprises a carrier phase validity indicator PLI, a carrier phase confidence indicator PLC, a carrier frequency validity indicator FLI, a carrier frequency confidence indicator FLC, a code phase validity indicator CLI, and a code phase confidence indicator CLC, the carrier phase error $\phi$ residual of the second measurement error vector is uncertain and indicated as uncertain by the measurement covariance matrix M of the second measurement error vector, the selected measurement error vector comprises an uncertain carrier phase error $\phi$ residual indicated by the carrier phase validity indicator PLI and the carrier phase confidence indicator PLC of the selected indication vector, the carrier phase error $\phi$ residual and carrier phase acceleration error $\phi''$ of the third measurement error vector is uncertain and indicated as uncertain by the measurement covariance matrix M of the third measurement error vector, the selected measurement error vector comprises an uncertain carrier phase error $\phi$ residual and an uncertain carrier phase acceleration error $\phi''$ as indicated by the carrier phase validity indicator PLI, the carrier phase confidence indicator PLC, the code phase validity indicator CLI, and the code phase confidence indicator CLC of the selected indication vector, when the PLC of a first indication vector provided by a first observation detector exceeds a predetermined first threshold, the selected measurement error vector is the first measurement error vector, when the PLC of the first indication vector is less than the predetermined first threshold, and the FLC of a second indication vector provided by a second observation detector is greater than a predetermined second threshold, the selected measurement error vector is the second measurement error vector, and when the PLC of the first indication vector is less than the predetermined first threshold and the FLC of the second indication vector is less than the predetermined second threshold, the selected measurement error vector is the third measurement error vector.

8. A detection block for receiving correlations and providing a selected measurement error vector and a selected indication vector, the detection block comprising, discriminators for receiving correlations and providing discriminations, sequential filters for receiving the discriminations and providing measurement error vectors, observation detectors for receiving correlations and the measurement error vectors and providing indication vectors, and a selector for selecting one of the measurement error vectors as a selected measurement error vector and for selecting one of the indication vectors as a selected indication vector, wherein, one of the observation detectors comprises, a maximizer for receiving measurement error residuals and the correlations for generating maximized quadrature signals, a rotator for rotating the measurement error residuals into a rotated residual matrix, a transformer for transforming the maximized quadrature signals by the rotated residual matrix into transformed quadrature signals, and a lock detector for receiving the transformed quadrature signals and generating an indication of the selected indication vector.

9. The detection block of claim 8, wherein the sequential filters comprise:

a first sequential filter for receiving a first combination of the discriminations provided by the plurality of discriminators and providing a first measurement error vector;

a second sequential filter for receiving a second combination of the discriminations provided by the plurality of discriminators and providing a second measurement error vector, wherein the measurement error vectors comprise at least the first measurement error vector and the second measurement error vector.

10. A detection block for receiving correlations and providing a selected measurement error vector and a selected indication vector, the detection block comprising, discriminators for receiving correlations and providing discriminations, sequential filters for receiving the discriminations and providing measurement error vectors, observation detectors for receiving correlations and the measurement error vectors and providing indication vectors, and a selector for selecting one of the measurement error vectors as a selected measurement error vector and for selecting one of the indication vectors as a selected indication vector, wherein, each indication vector comprises a carrier phase validity indicator PLI, a carrier phase confidence indicator PLC, a carrier frequency validity indicator FLI, a carrier frequency confidence indicator FLC, a code phase validity indicator CLI, and a code phase confidence indicator CLC, each of the observation detectors comprises, a maximizer for receiving measurement error residuals and the correlations for generating maximized quadrature signals, a rotator for rotating the measurement error residuals into a rotated residual matrix, a transformer for transforming the maximized quadrature signals by the rotated residual matrix into transformed quadrature signals, a carrier phase lock detector for receiving the transformed quadrature signals and generating the phase validity indication PLI and the phase confidence indicator PLC of an indication vector, a carrier frequency lock detector for receiving the transformed quadrature signals and generating a carrier frequency validity indicator FLI and a carrier frequency confidence indicator PLC of an indication vector, and a code phase lock detector for receiving the transformed quadrature signals and generating a code phase validity indicator CLI and a code phase confidence indicator CLC of an indication vector.

11. The detection block of claim 10, wherein the sequential filters comprise:

a first sequential filter for receiving a first combination of the discriminations provided by the plurality of discriminators and providing a first measurement error vector;

a second sequential filter for receiving a second combination of the discriminations provided by the plurality of discriminators and providing a second measurement error vector, wherein the measurement error vectors comprise at least the first measurement error vector and the second measurement error vector.

12. A navigation system for receiving positioning signals modulating a carrier having a phase and a frequency modulated by a code, the navigation system for providing a navigation solution, the system comprising, a code generator for generating replicas of the code, a down converter for down converting the positioning signals into quadrature signals, a correlator for correlating the quadrature signals with the replicas of the code for generating correlations in quadrature, a detection block for receiving the correlations and providing measurement error vectors including a selected measurement error vector and providing indication vectors including a selected indication vector, the detection block comprising channels for respectively generating one of the measurement error vectors and one of the indication vectors, and a navigation estimator for receiving the selected measurement error vector and the selected indication vector and providing the navigation solution, wherein, the positioning signals are transmitted from a global positioning satellite, the navigation solution drives the code generator, the replicas comprise early, prompt, and late replicas, the correlations are early, prompt, and late correlations in quadrature, and the navigation system is an ultra-tightly coupled navigation system.

13. The navigation system of claim 12, wherein the channels of the detection block comprise:

a plurality of discriminators for receiving the correlations and providing discriminations, a plurality of sequential filters for receiving the discriminations and providing measurement error vectors, wherein the plurality of sequential filters comprises:

a first sequential filter for receiving a first combination of the discriminations provided by the plurality of discriminators and providing a first measurement error vector, and a second sequential filter for receiving a second combination of the discriminations provided by the plurality of discriminators and providing a second measurement error vector, observation detectors for receiving the correlations and the measurement error vectors and providing indication vectors, wherein the measurement error vectors comprise at least the first measurement error vector and the second measurement error vector, and a selector for selecting one of the measurement error vectors as the selected measurement error vector and for selecting one of the indication vectors as the selected indication vector.

14. The navigation system of claim 12, wherein the channels comprise sequential filters for receiving the correlations of the positioning signals transmitted from one transmitter.

15. A navigation system for receiving positioning signals modulating a carrier having a phase and a frequency modulated by a code, the navigation system for providing a navigation solution, the system comprising, a code generator for generating replicas of the code, a down converter for down converting the positioning signals into quadrature signals, a correlator for correlating the quadrature signals with the replicas of the code for generating correlations in quadrature, a detection block for receiving the correlations and providing measurement error vectors including a selected measurement error vector and providing indication vectors including a selected indication vector, the detection block comprising channels for respectively generating one of the measurement error vectors and one of the indication vectors, and a navigation estimator for receiving the selected measurement error vector and the selected indication vector and providing the navigation solution, wherein, each of the channels comprises, a discriminator for receiving correlations and providing a discrimination, a sequential filter for receiving the discrimination and providing a measurement error vector, and an observation lock detector for receiving correlations and the measurement error vector and providing one of indication vectors.

16. A navigation system for receiving positioning signals modulating a carrier having a phase and a frequency modulated by a code, the navigation system for providing a navigation solution, the system comprising, a code generator for generating replicas of the code, a down converter for down converting the positioning signals into quadrature signals, a correlator for correlating the quadrature signals with the replicas of the code for generating correlations in quadrature, a detection block for receiving the correlations and providing measurement error vectors including a selected measurement error vector and providing indication vectors including a selected indication vector, the detection block comprising channels for respectively generating one of the measurement error vectors and one of the indication vectors, and a navigation estimator for receiving the selected measurement error vector and the selected indication vector and providing the navigation solution, wherein, the channels comprise sequential filters for receiving the correlations of the positioning signals transmitted from one transmitter, the sequential filters for generating measurement error vectors, and the measurement error vectors are processed by respective observation lock detectors for generating indication vectors for indicating uncertainty of the measurement error vectors.

17. A navigation system for receiving positioning signals modulating a carrier having a phase and a frequency modulated by a code, the navigation system for providing a navigation solution, the system comprising, a code generator for generating replicas of the code, a down converter for down converting the positioning signals into quadrature signals, a correlator for correlating the quadrature signals with the replicas of the code for generating correlations in quadrature, a detection block for receiving the correlations and providing measurement error vectors including a selected measurement error vector and providing indication vectors including a selected indication vector, the detection block comprising channels for respectively generating one of the measurement error vectors and one of the indication vectors, and a navigation estimator for receiving the selected measurement error vector and the selected indication vector and providing the navigation solution, wherein, the channels comprise sequential filters for receiving the correlations of the positioning signals transmitted from one transmitter, the sequential filters for generating measurement error vectors, the measurement error vectors are processed by respective lock detectors for indicating uncertainty of the measurement error vectors, and the detection block comprises a selector for selecting one of the measurement error vectors to be the selected measurement error vector and for selecting one of the indication vectors to be the selected indication vector.

18. A detection block for receiving correlations and providing a selected measurement error vector and a selected indication vector, the detection block comprising, a plurality of discriminators for receiving the correlations and providing discriminations,
a plurality of sequential filters for receiving the discriminations and providing measurement error vectors, wherein the plurality of sequential filters comprises:
  a first sequential filter for receiving a first combination of the discriminations provided by the plurality of discriminators and providing a first measurement error vector, and
  a second sequential filter for receiving a second combination of the discriminations provided by the plurality of discriminators and providing a second measurement error vector,
observation detectors for receiving the correlations and the measurement error vectors and providing indication vectors, wherein the measurement error vectors comprise at least the first measurement error vector and the second measurement error vector,
a selector for selecting one of the measurement error vectors as a selected measurement error vector and for selecting one of the indication vectors as a selected indication vector, and
wherein the plurality of sequential filters further comprises a third sequential filter for receiving a third combination of the discriminations provided by the plurality of discriminators and providing a third measurement error vector, and wherein the measurement error vectors comprise the third measurement error vector.

19. A navigation system for receiving positioning signals modulating a carrier having a phase and a frequency modulated by a code, the navigation system for providing a navigation solution, the system comprising,
a code generator for generating replicas of the code,
a down converter for down converting the positioning signals into quadrature signals,
a correlator for correlating the quadrature signals with the replicas of the code for generating correlations in quadrature,
a detection block for receiving the correlations and providing measurement error vectors including a selected measurement error vector and providing indication vectors including a selected indication vector, the detection block comprising:
  a plurality of discriminators for receiving the correlations and providing discriminations,
  a plurality of sequential filters for receiving the discriminations and providing measurement error vectors, wherein the plurality of sequential filters comprises:
    a first sequential filter for receiving a first combination of the discriminations provided by the plurality of discriminators and providing a first measurement error vector, and
    a second sequential filter for receiving a second combination of the discriminations provided by the plurality of discriminators and providing a second measurement error vector,
  observation detectors for receiving the correlations and the measurement error vectors and providing indication vectors, wherein the measurement error vectors comprise at least the first measurement error vector and the second measurement error vector, and
  a selector for selecting one of the measurement error vectors as the selected measurement error vector and for selecting one of the indication vectors as the selected indication vector,
a navigation estimator for receiving the selected measurement error vector and the selected indication vector and providing the navigation solution, and
wherein the plurality of sequential filters further comprises a third sequential filter for receiving a third combination of the discriminations provided by the plurality of discriminators and providing a third measurement error vector, and wherein the measurement error vectors comprise the third measurement error vector.

* * * * *